United States Patent [19]

Trine et al.

[11] 4,209,869
[45] Jul. 1, 1980

[54] LIFTING APPARATUS FOR DOCKBOARD

[75] Inventors: Ralph D. Trine; Robert L. Le Clear, both of Albion, Mich. Equipment Company, 02, Albion, Mich.

[73] Assignee: T & S Equipment Company, Albion, Mich.

[21] Appl. No.: 970,392

[22] Filed: Dec. 18, 1978

[51] Int. Cl.² .................................................. E01D 1/00
[52] U.S. Cl. ............................................ 14/69.5; 14/72.5
[58] Field of Search ........................ 14/69.5, 72.5, 71.3

[56] References Cited

U.S. PATENT DOCUMENTS

| | | | |
|---|---|---|---|
| 2,329,855 | 9/1943 | Rydner | 14/69.5 |
| 2,452,289 | 10/1948 | Bryson | 14/69.5 |
| 2,597,213 | 5/1952 | Whiteman | 14/72.5 |
| 2,829,390 | 4/1958 | Noland | 14/72.5 |
| 2,880,431 | 4/1959 | Noland | 14/72.5 |
| 3,122,764 | 3/1964 | Ambli | 14/69.5 X |
| 4,075,729 | 2/1978 | Conner | 14/72.5 |
| 4,087,876 | 5/1978 | Fillman | 14/72.5 |

Primary Examiner—Nile C. Byers, Jr.
Attorney, Agent, or Firm—Jacobi, Lilling & Siegel

[57] ABSTRACT

A lifting lever is rotatably mounted on at least one side of a dockboard for movement to a raised position for raising and holding one end of the dockboard above a loading dock or the like so that the forks of a lift truck or the like can be positioned under the dockboard to move it. The combination of the locations of the pivot point for the lever, a roller on the lever and a lever stop on the dockboard provide an over-center lock in the raised position of the lever and an automatic return of the lever to the lower position upon lifting of the dockboard by a forklift truck or similar vehicle. In one embodiment of the invention, the bearing roller engages the loading dock to lift the dockboard as the lever is moved to the raised position. In a second embodiment, the bearing roller engages a lifting arm pivotally mounted on the dockboard to move one end of the arm into engagement with the loading dock to lift the dockboard.

9 Claims, 5 Drawing Figures

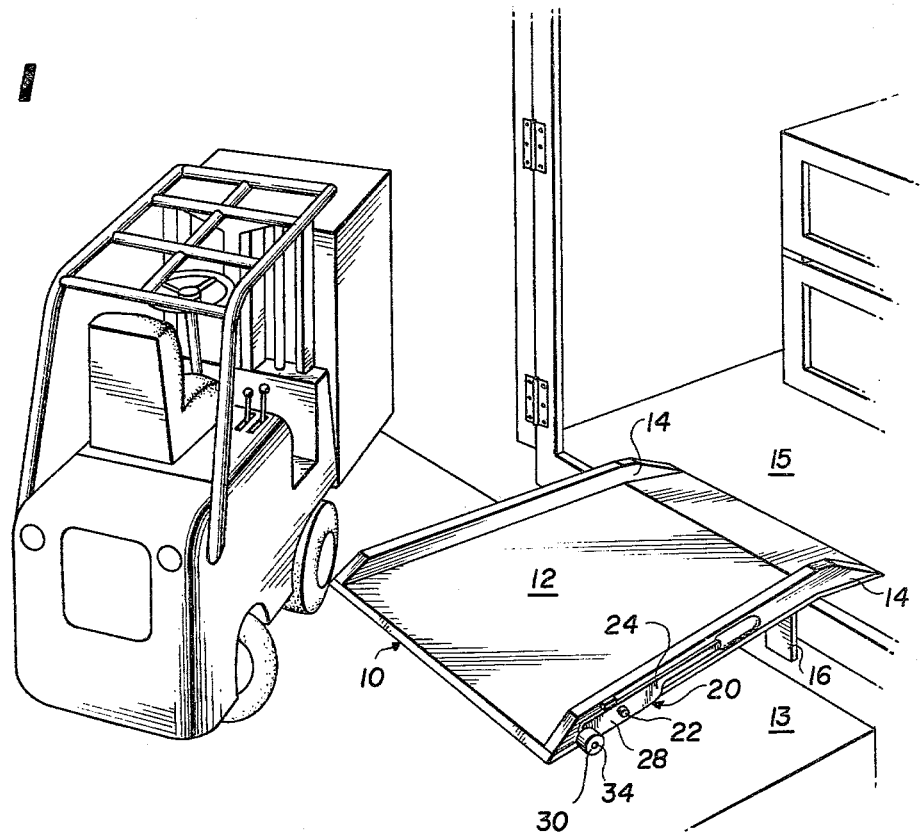
FIG. 1
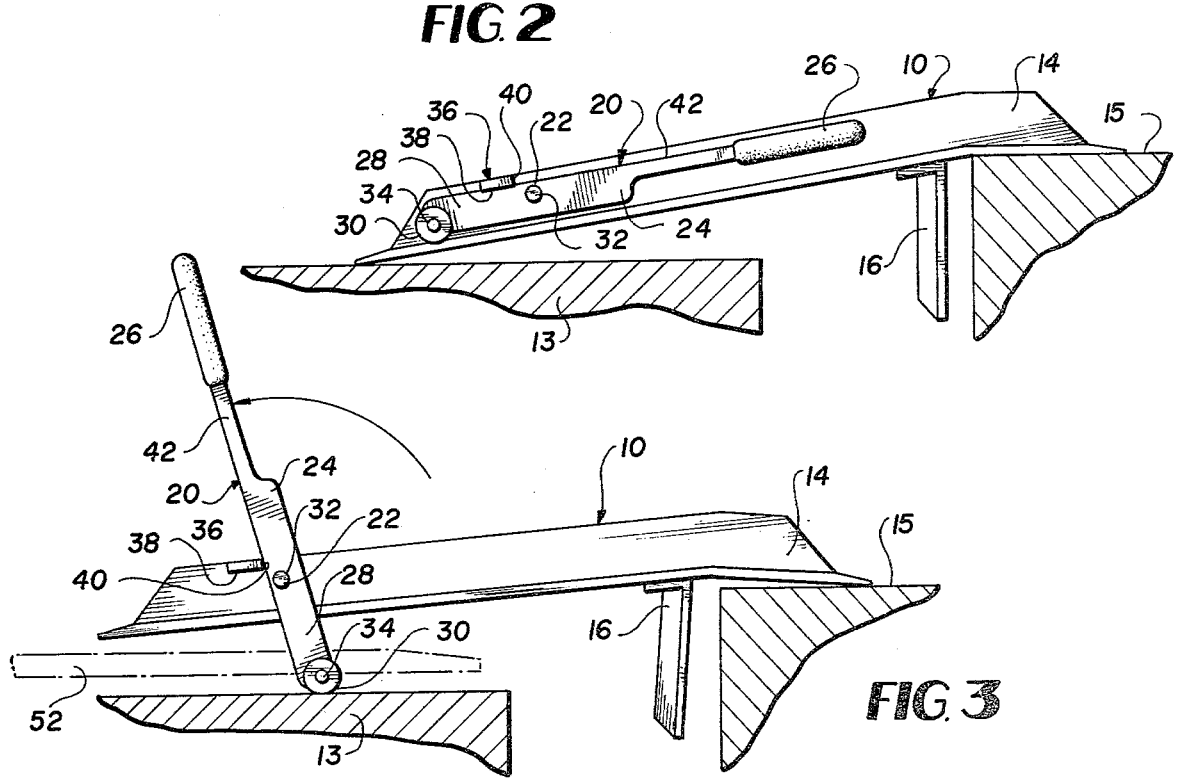
FIG. 2
FIG. 3

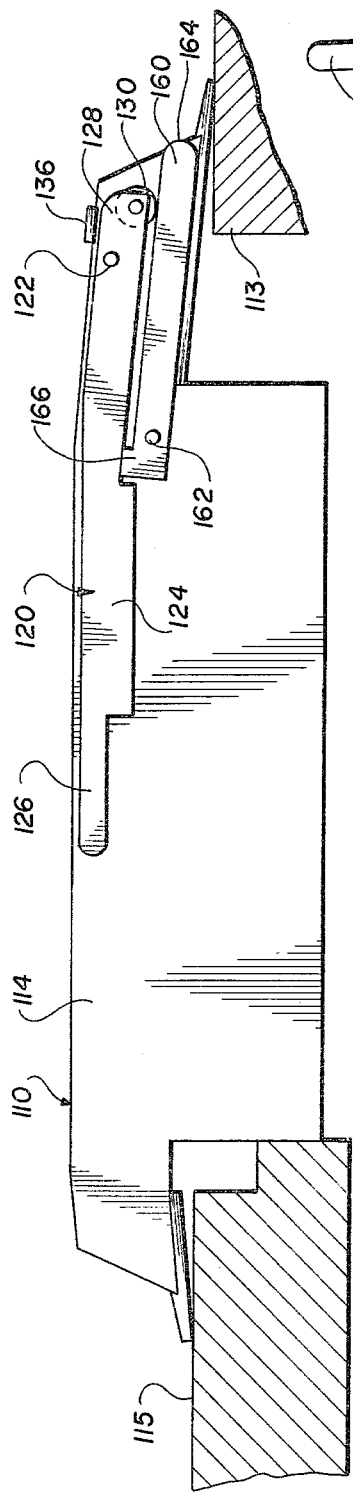
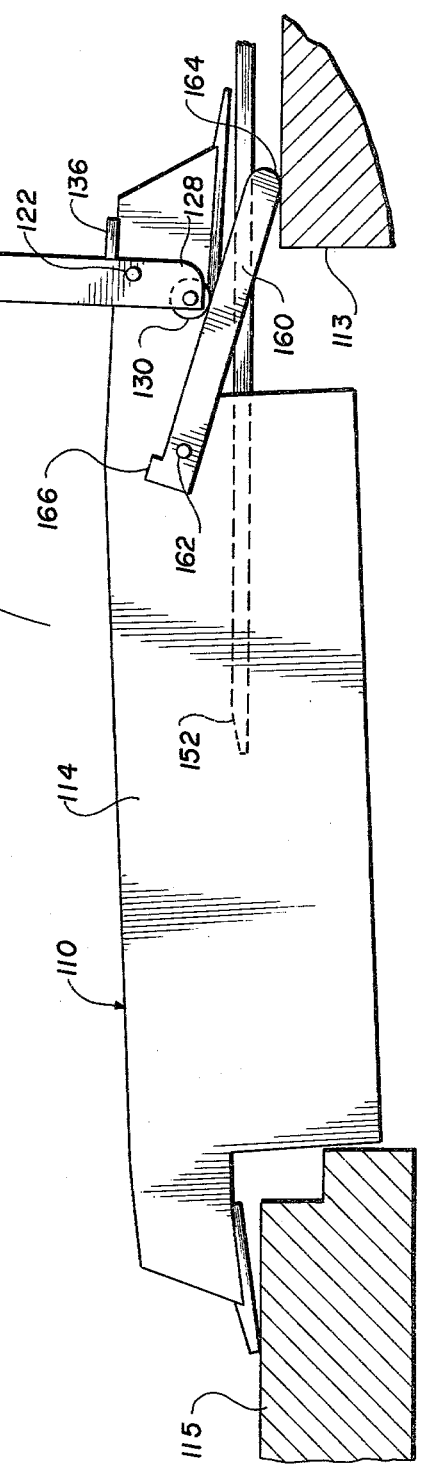
FIG. 4
FIG. 5

LIFTING APPARATUS FOR DOCKBOARD

BACKGROUND OF THE INVENTION

The trucking industry today transports more, heavier, and bulkier freight than ever before. The vast majority of such freight normally is loaded into and off-loaded from transporting trailers and rail cars from fixed loading docks whose heights can at best only average the variations in height of the loading surfaces of the various trucks and rail cars, both loaded and unloaded, that are serviced. This variation in height and the lateral gap that normally exists between the truck or car and loading dock is usually bridged by use of a dockboard or dock bridge. These dockboards are in most cases of a portable nature and are continually repositioned to serve different trucks or rail cars that are positioned in different locations.

In order to carry the heavy loads being moved on and off trucks or cars by means of hand trucks or forklifts, the dockboards are necessarily of considerable weight and their transport is generally handled by means of a forklift or other material handling vehicle rather than by hand. One of the problems in the transport of these dockboards is initially getting the forks of the forklift under the dockboard which normally sits with its exposed edge in full contact with the loading dock. A simple, safe, rugged and easy to use lifting apparatus for raising the edge of the dockboard to allow positioning of the lifting forks thereunder is a long recognized problem from both the operational and safety standpoints.

Although dockboards with such lifting apparatus have been met with limited success, none have provided a lifting apparatus that is simple to operate and construct, safe for the worker, and has a minimal number of moving parts to require little or no maintenance.

SUMMARY OF THE INVENTION

The dockboard lifting apparatus of the present invention comprises a minimal number of moving parts and is simple in operation and construction. A lift lever is pivotally mounted on at least one side rail of a dockboard in such a manner that, when the lever is rotated to a raised position, the dockboard edge is raised above the loading dock with a minimal effort, held in the raised position by the weight of the dockboard so that lifting forks can be positioned beneath the dockboard, and automatically returned to its inoperative position when the dockboard is lifted by a forklift or the like.

A stop is provided on the dockboard and is so located that when the lever is moved to its raised position against the stop, the lever is in an over-center condition wherein the weight of the dockboard serves to hold the lever and the dockboard in the raised position. When the dockboard is lifted by a forklift or the like the dockboard returns to a lower or inoperative position because of the positioning of the pivot point for the lever which enables the lever to fall by its own weight to the inoperative position.

In one embodiment, the end of the lever that bears against the loading dock while raising the dockboard is provided with a roller or similar antifriction element to facilitate movement of the lever and lifting of the dockboard. In another embodiment, the end of the lever engages a lifting arm pivotally mounted on the dockboard to move the arm into engagement with the loading dock and lift the dockboard.

BRIEF DESCRIPTION OF THE DRAWINGS

FIG. 1 is a perspective view of a dockboard in use between a loading dock and a carrier vehicle, the dockboard having the lifting apparatus of the present invention;

FIG. 2 is a side elevational view of the dockboard with the lifting apparatus in an inopertive position;

FIG. 3 is a side elevational view similar to FIG. 2, showing the lifting apparatus in the raised or operative position;

FIG. 4 is a side elevational view of a modified form of dockboard in accordance with the present invention, showing the lifting apparatus in an inoperative position; and FIG. 5 is a side elevational view of the dockboard of FIG. 4, showing the lifting apparatus in an operative position.

DESCRIPTION OF THE PREFERRED EMBODIMENTS

Referring to FIGS. 1-3, a typical dockboard 10 comprises a floor 12 extending between the loading dock 13 and the floor 15 of a carrier vehicle such as a truck or rail car. The dockboard 10 is provided with side rails or portions 14 providing additional load bearing strength and safety, and a stop plate 16 to maintain the dockboard in position between the dock 13 and floor 15. Preferably, the dockboard is constructed from aluminum or steel components, but could be made of any suitable material depending on service conditions.

A lift lever 20 is rotatably mounted on at least one side rail 14 of the dockboard 10 by means of a pivot pin 22 or other suitable means. The lift lever 20 preferably is made from rigid stock, such as aluminum or steel or another suitable material, and comprises a long arm 24 terminating in a handle 26 and a short arm 28 preferably having an antifriction means such as a roller 30 at its end portion.

In accordance with the present invention, pivot pin 22 is offset from the longitudinal centerline of the lever 20, and the mounting pin 34 or center of roller 30 is laterally offset from the pivot pin 22, as shown in FIGS. 2 and 3.

The pivot pin 22 and mounting pin 34 preferably are formed of hard metal stock such as steel or another suitable material, and may be provided with a bushing or bearing (not shown). The pivot pin 22 is rigidly attached to the side rail 14 by any convenient means, such as by welding or bolting, in a location near the end of the dockboard 10 that rests on the loading dock 13. The mounting pin 34 is rigidly mounted on the end portion of the short arm 28 of the lift lever 20. The short arm 28 of the lift lever 20 preferably is shorter than the distance from pivot pin 22 to the closest end of the dockboard 10, as shown in FIGS. 1-3, so that the lift lever does not extend beyond this end of the dockboard.

A stop 36 is rigidly affixed to the side rail 14 near the upper edge thereof, as shown in FIGS. 2 and 3. The stop 36 is positioned with faces 38 and 40 in a relationship to the upper edge 42 of lift lever 20 as will be explained hereinafter. The lift lever 20 and roller 30 are prevented from removal from pivot pin 22 and mounting 34, respectively, by any suitable means such as cotter pins or other retaining fasteners (not shown).

Referring to FIG. 2, the dockboard 10 is shown in position between a typical loading dock 13 and the floor 15 of a truck, rail car or the like, with the lift lever 20 in the inoperative position. In the inoperative position, the face 38 of limiting stop 36 contacts the edge 42 of the short arm 28 of lift lever 20. The lift lever 20 is essentially completely behind the side rail 14 as viewed from the floor 12, and presents no safety problem for personnel or vehicles passing over the dockboard 10. The roller 30 on the end portion of the short arm 28 is out of engagement with the loading dock 13.

In FIG. 3, the dockboard 10 is seen with the lift lever 20 in the operative position wherein the end portion of the dockboard 10 is raised above the loading dock 13. The lift lever is rotated in the direction of the arrow in FIG. 3 from the inoperative to the operative position by gripping the handle 26 and manually rotating the lift lever 20 until the edge 42 of the long arm 24 contacts the face 40 of limiting stop 36. During this rotation, the roller 30 on the short arm 28 engages the loading dock 13 to lift the dockboard therefrom. Because of the offset of pivot pin 22 and roller mounting pin 34, the roller 30 is in contact with the loading dock 13 in a slightly over-center condition when the lift lever is in the operative position shown in FIG. 3, and the weight of the dockboard 10 maintains the lift lever 20 in this operative position. This allows workers to stand clear for safety while the forks 52 of a forklift (now shown) or similar moving means are inserted under the dockboard 10.

As the forks 52 raise the dockboard 10 to a substantially horizontal transporting position above the loading dock 13, the weight of the dockboard 10 is removed from the roller 30 and at essentially the same time the lift lever 20, being in contact with the limiting stop 36, is moved back to the inoperative position shown in FIG. 2. Because of the positioning of the pivot point for the lift lever, it falls by its own weight to the inoperative position when the dockboard is lifted by the forks 52. The dockboard 10 may now be relocated and positioned adjacent another truck or rail car as shown in FIG. 1 so as to be used again for movement of freight.

FIGS. 4 and 5 illustrate a modified form of the lifting apparatus of the present invention which is especially adapted for use between a loading dock 113 and the floor 115 of a rail car or the like. In such cases, the spacing between the rail car and the dock is sometimes so large that only a small portion of the dockboard 110 can be positioned over the loading dock so that the roller 130 on the lift lever 120 cannot engage the dock when the lever is rotated to the operative position. The modified lifting apparatus of FIGS. 4 and 5 is constructed to solve this problem and to provide for the lifting of the dockboard even when only a small end portion thereof rests on the loading dock.

The modified lifting apparatus essentially comprises all of the component parts of the lifting apparatus shown in FIGS. 1–3, namely, the lift lever 120 pivotally mounted on the side rail 114 of the dockboard 110, a handle 126 on the long arm 124 of the lift lever, a roller 130 on the end portion of the short arm 128 of the lift lever, and a limiting stop 136 on the side rail 114 which is engageable by the lift lever to control its inoperative and operative positions. Generally, the operation of the modified lifting apparatus is the same as that of the apparatus shown in FIGS. 1–3, i.e., the lever 120 may be manually rotated from the inoperative position shown in FIG. 4 to operative position shown in FIG. 5 to lift the end portion of the dockboard 10 above the loading dock 113 so that lifting forks 152 or other suitable lifting means may be positioned under the dockboard as shown in FIG. 5.

In the modified apparatus of FIGS. 4 and 5, however, the roller 130 does not contact the loading dock. Instead, the roller 130 engages the upper surface of a lifting arm 160 that is pivotally mounted at pin 162 near one end thereof on the side rail 114. The lifting arm 160 is disposed beneath the lift lever 120 and has an outer end 164 that is curved or provided with suitable antifriction means such as a roller (not shown) for engagement with the loading dock 113 as shown in FIG. 5. Accordingly, upon rotation of the lift lever 120 from the inoperative position of FIG. 4 to the operative position of FIG. 5, the roller 130 on the end portion of the lever 120 engages the lifting arm 160 to pivot it and move its outer end 164 into engagement with the loading dock 113 to lift the end portion of the dockboard above the dock as shown in FIG. 5.

Like the lifting apparatus of FIGS. 1–3, the positioning of the pivot pin 122 for the lift lever 120, the roller 130 and the limiting stop 136 results in the roller 130 being in engagement with the lifting arm 160 in an over-center position with respect to the pivot pin 122 when the lift lever 120 is in the operative position shown in FIG. 5. Because of this over-center condition, the weight of the dockboard 110 serves to maintain the lift lever 120 in the operative position.

Upon the lifting of the dockboard 110 by the lifting forks 152 to remove the weight of the dockboard from the lift lever 120, the lever 120 rotates to the inoperative position shown in FIG. 4. The off-center position of the pivot pin 122 relative to the longitudinal axis of the lever 120 enables the weight of the lever to return it to the inoperative position. The lever 120 at point 166 contacts the adjacent upper surface of the lifting arm 160 and returns it to the inoperative position shown in FIG. 4.

It will be readily seen that the lifting apparatus of this invention comprises only a few essential moving parts and may be made of rugged materials that will allow its continuous use under severe conditions of abuse without failure. The combination of the positioning of the pivot pin 22 and the roller 30, along with the limiting stop 36, make the operation so simple that essentially no skill is required to effect the raising of the end portion of the dockboard 10 to its desired position.

While one lift lever 20 has been shown in the drawings, in many cases it would be advantageous to have a lift lever mounted on each of the side rails 14 to facilitate uniform lifting of the end portion of the dockboard above the loading dock. Also, within the scope of the present invention, the end portion of the short lever arm 28 may be of smooth, curved configuration and the roller 30 may be omitted.

What is claimed is:

1. Apparatus for lifting one end of a dockboard or the like having side portions and adapted to be positioned on and between a loading dock and the floor of a carrier vehicle or the like, said lifting apparatus comprising:

a lift lever pivotally mounted on one side portion of the dockboard and having an end portion that is engageable with the loading dock to lift the adjacent end of the dockboard above the loading dock when said lift lever is moved to an operative position, the pivotal point of said lift lever being so positioned that said lever end portion is in an over-center position relative to said pivotal point when said lift lever is in said operative position, and stop means on said side portion for limiting movement of said lift lever in one direction to said operative position and in the opposite direction to an inoperative position, whereby said lift lever is maintained in said operative position by said stop means and by the weight of said dockboard owing to the overcenter position of said lever end portion, said lift lever being movable to said inoperative position wherein said lever end portion is out of engagement with the loading dock and said lift lever is disposed substantially within the confines of the one side portion of the dockboard, the pivotal point of said lift lever being so positioned with respect to the longitudinal axis of said lift lever that the weight of said lift lever serves to return it to said inoperative position when the weight of the dockboard is removed from said lift lever.

2. The lifting apparatus of claim 1 wherein said lever end portion comprises antifriction means engageable with the loading dock.

3. The lifting apparatus of claim 2 wherein said antifriction means is a roller rotatably mounted on said lever end portion.

4. Apparatus for lifting one end of a dockboard or the like having side portions and adapted to be positioned on and between a loading dock and the floor of a carrier vehicle or the like, said lifting apparatus comprising:

a lift lever pivotally mounted on one side portion of the dockboard and having an end portion, a lifting arm movably mounted on said one side portion beneath said lift lever and having an end portion engageable with the loading dock, said lever end portion being slidably engageable with said lifting arm to move its end portion into engagement with the loading dock to lift the adjacent end of the dockboard above the loading dock when said lift lever is moved to an operative position, the pivotal point of said lift lever being so positioned that said lever end portion is in an over-center position relative to said pivotal point when said lift lever is in said operative position, and stop means on said side portion for limiting movement of said lift lever in one direction to said operative position, whereby said lift lever is maintained in said operative position by said stop means and by the weight of said dockboard owing to the overcenter position of said lever end portion.

5. The lifting apparatus of claim 4 wherein said lift lever is movable to an inoperative position wherein said lever end portion is out of engagement with said lifting arm, whereby said lifting arm end portion is movable out of engagement with the loading dock.

6. The lifting apparatus of claim 5 wherein said stop means limits movement of said lift lever in the opposite direction to said inoperative position.

7. The lifting apparatus of claim 6 wherein the pivotal point of said lift lever is so positioned with respect to the longitudinal axis of said lift lever that the weight of said lift lever serves to return it to said inoperative position when the weight of the dockboard is removed from said lift lever.

8. The lifting apparatus of claim 4 wherein said end portions of said lift lever and said lifting arm comprise antifriction means.

9. The lifting apparatus of claim 8 wherein said antifriction means is a first roller rotatably mounted on said lever end portion and a second roller rotatably mounted on said lifting arm end portion.